United States Patent
Refai

(10) Patent No.: US 7,254,124 B2
(45) Date of Patent: Aug. 7, 2007

(54) METHODS, APPARATUS AND COMPUTER PROGRAM PRODUCTS FOR CONTROLLING A REVERSE LINK TRAFFIC CHANNEL CODE RESPONSIVE TO DETECTION OF A DUPLICATE TERMINAL IDENTITY

(75) Inventor: Wail Refai, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 1287 days.

(21) Appl. No.: 10/225,833

(22) Filed: Aug. 22, 2002

(65) Prior Publication Data

US 2004/0037250 A1 Feb. 26, 2004

(51) Int. Cl.
H04B 7/26 (2006.01)
(52) U.S. Cl. .................... 370/342; 370/475
(58) Field of Classification Search ............ 370/252, 370/342, 475
See application file for complete search history.

(56) References Cited

U.S. PATENT DOCUMENTS

| | | | |
|---|---|---|---|
| 2004/0242222 A1* | 12/2004 | An et al. ............... | 455/423 |
| 2004/0259596 A1* | 12/2004 | Rajkotia et al. ........ | 455/561 |
| 2006/0135161 A1* | 6/2006 | Jiang et al. ............ | 455/436 |
| 2006/0154646 A1* | 7/2006 | Tung ..................... | 455/411 |

FOREIGN PATENT DOCUMENTS

| | | |
|---|---|---|
| WO | WO 96/22639 | 7/1996 |
| WO | WO 99/49597 | 9/1999 |
| WO | WO 99/59361 | 11/1999 |

OTHER PUBLICATIONS

Wei Wang et al., 'Performance Analysis on Wireless Resource Management of ESN Exhaustion', Communications and Information Technology, Oct. 2005, vol. 2, pp. 1520-1523.*
"Physical Layer Standard for cdma2000 Spread Spectrum Systems," 3rd Generation Partnership Project 2 "3GPP2", 3GPP2 C.S0002-0 Version 1.0, Jul. 1999, pp. 2-97 through 2-104.
"Japanese ESN assignment and necessity of the global discussion," KDDI Corporation, Feb. 11, 2002, 7 pages.
"A Proposal on MEID requirement," KDDI Corporation, Apr. 15, 2002, 13 pages.
International Search Report, PCT/US03/27428, Feb. 3, 2004.

* cited by examiner

*Primary Examiner*—Melvin Marcelo
(74) *Attorney, Agent, or Firm*—Myers Bigel Sibley & Sajovec PA

(57) ABSTRACT

According to some embodiments of the present invention, a reverse link traffic channel code used by a terminal accessing a CDMA wireless communications system is controlled responsive to determining whether the terminal has a duplicate Electronic Serial Number (ESN). In some embodiments, for example, an alternative ESN may be sent to the terminal having the duplicate ESN for use in generating the reverse link traffic channel code. In other embodiments, a time shift may be applied in generating the reverse traffic channel code, such as by time-shifting the reverse link traffic channel code or a long code used to generate the reverse link traffic channel code. In still other embodiments, an alternative long code mask, such as a private long code mask used for a voice privacy feature, may be used responsive to detection of a duplicate ESN. The present invention may be embodied as methods of operating wireless communications systems and/or terminals, wireless communications apparatus such as network components and terminals, and computer program products including program code configured to execute in a wireless communications apparatus.

58 Claims, 13 Drawing Sheets

METHODS, APPARATUS AND COMPUTER PROGRAM PRODUCTS FOR CONTROLLING A REVERSE LINK TRAFFIC CHANNEL CODE RESPONSIVE TO DETECTION OF A DUPLICATE TERMINAL IDENTITY

BACKGROUND OF THE INVENTION

The present invention relates to wireless communications, and more particularly, to code division multiple access (CDMA) communications.

In conventional CDMA systems, user signals are typically separated using user-specific spreading codes. In IS-95 and IS-2000 systems, for example, forward link (base station to mobile terminal) Traffic Channels are separated using Walsh codes assigned to users during call setup. Reverse link (mobile terminal to base station) traffic channels are typically separated using what is referred to as a "long code," which is a very long pseudo-random code (e.g., $2^{42}-1$ chips).

The reverse link traffic channel code is typically generated in two steps. In a first step, a pseudo-random code that is the same for all users is generated. In a second, "code masking" step, the common pseudo-random code is processed using a mask specific to the user. In typical IS-95 and IS-2000 systems, the mask used is a function of the Electronic Serial Number (ESN) of the terminal.

In order to recover a reverse traffic channel transmitted by a terminal, a base station typically synchronizes itself with the reverse link signal in a process commonly referred to as code acquisition. In a typical code acquisition process, a base station searches through the reverse link traffic channel code until it can gather sufficient information to synchronize with the terminal. Because of the length of the typical reverse link traffic channel code, it may not be practical to search the entire length of the code. Accordingly, the IS-95 and IS-2000 standards require that terminals transmit on the reverse link in synchronism with the System Time reference. This can allow the base station to search a relatively small amount of code to acquire the reverse link traffic channel code, typically an amount of the code corresponding to two-way propagation delay and multipath delay, e.g., on the order of plus and minus a few chips.

Under current IS-95 and IS-2000 standards, no two mobile terminals are allowed to have the same ESN. If mobile terminals having the same reverse link traffic channel code are operating in close proximity, e.g., transmitting to the same base station, their reverse link traffic channels may coincide, leading to crosstalk. The ESN currently used is a 32-bit value, thus allowing for billions of unique ESNs. However, it has been predicted that ESN values will be exhausted by 2004. Moreover, because there is an ongoing trend to provide for worldwide compatibility among wireless devices and systems, and because ESNs are typically assigned by various entities in various countries, enforcing "no duplicate ESN" rules may become problematic.

SUMMARY OF THE INVENTION

According to embodiments of the present invention, a reverse link traffic channel code used by a terminal accessing a CDMA wireless communications system is controlled responsive to determining whether the terminal has a duplicate Electronic Serial Number (ESN), i.e., an ESN that is the same as another terminal that is already using the system. In some embodiments, for example, an alternative ESN may be sent to the terminal having the duplicate ESN for use in generating its reverse link traffic channel code. In other embodiments, a time shift is applied in generating the reverse traffic channel code, such as by time-shifting the reverse link traffic channel code or a long code used to generate the reverse link traffic channel code. In still other embodiments, an alternative long code mask, such as a private long code mask used for a voice privacy feature, is used responsive to detection of a duplicate ESN. The present invention may be embodied as methods of operating wireless communications systems and/or terminals, wireless communications apparatus, such as network components and terminals, and computer program products including program code configured to execute in a wireless communications apparatus.

DETAILED DESCRIPTION

Figure 1:
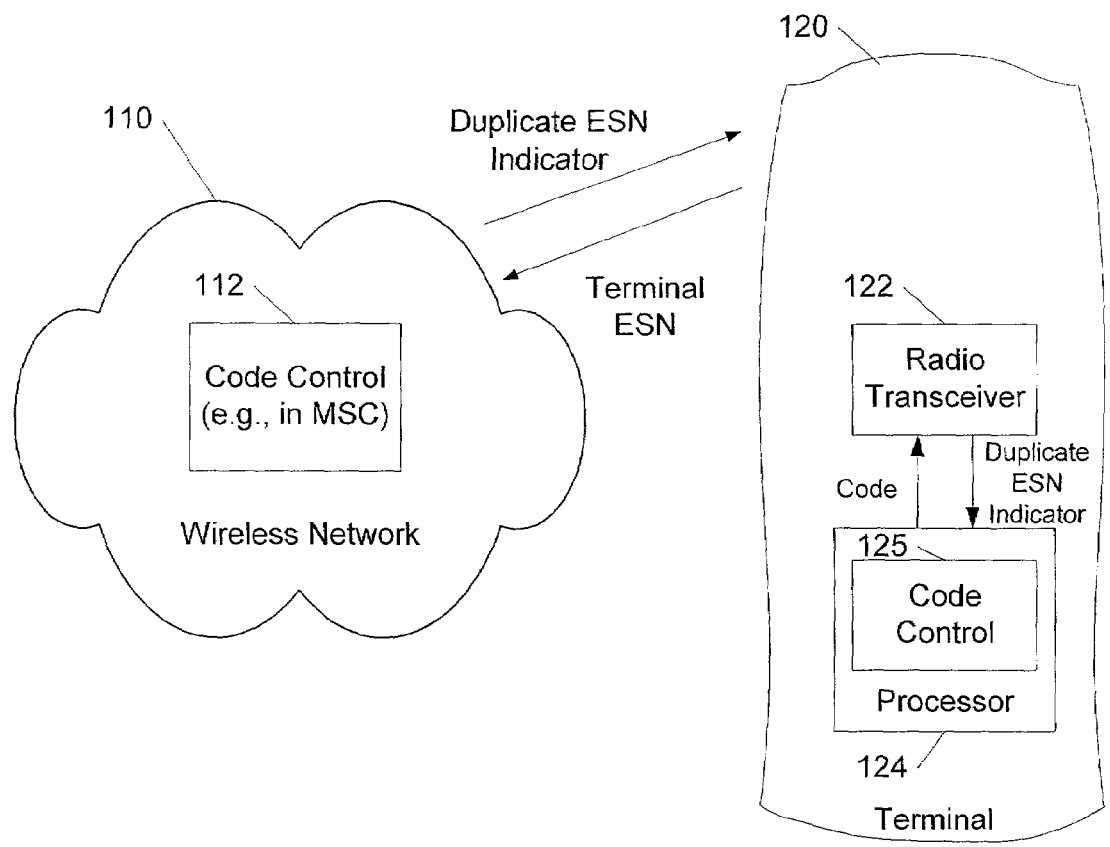
FIG. 1 is a schematic diagram of wireless communications apparatus according to some embodiments of the present invention.

The present invention will now be described more fully with reference to the accompanying drawings, in which exemplary embodiments of the invention are shown. These embodiments are provided so that this application will be thorough and complete. Like numbers refer to like elements throughout.

According to various embodiments of the present invention, reverse link traffic channel codes used by terminals in a code division multiple access (CDMA) communications system are controlled responsive to detection of a duplicate Electronic Serial Number (ESN). According to some aspects of the present invention, a wireless communications system instructs a terminal having a duplicate ESN to use an alternative ESN, which results in the terminal using a different code than it would use under normal circumstances. In further embodiments, detection of a duplicate ESN results in the system instructing the terminal bearing the duplicate ESN to apply a time shift to its code, e.g., to a delay the code by a predetermined number of chips or by a frame offset or to delay a component of the terminal's long code, such as a Q channel component, a predetermined number of chips. In still further embodiments, detection of a duplicate ESN leads to assignment of an alternative long code mask for the terminal, such as a private long code mask such as may be used to implement a voice privacy feature.

In the present application, FIGS. 1-13 are diagrams illustrating exemplary apparatus and operations according to embodiments of the present invention. It will be understood that operations depicted in the diagrams, and combinations thereof, may be implemented using one or more electronic circuits, such as a circuits included in a component of a wireless communications system or in a wireless terminal. It will also be appreciated that, in general, operations depicted in the diagrams, and combinations thereof, may be implemented in one or more electronic circuits, such as in one or more discrete electronic components, one or more integrated circuits (ICs), one or more application specific integrated circuits (ASICs), and application specific circuit modules, as well as by computer program instructions which may be executed by a computer or other data processing apparatus, such as a microprocessor or digital signal processor (DSP), to produce a machine such that the instructions which execute on the computer or other programmable data processing apparatus create electronic circuits or other means that implement the specified operations. The computer program instructions may also be executed on one or more computers or other data processing apparatus to cause a series of actions to be performed by the computer(s) or other programmable apparatus to produce a computer implemented process that includes the specified operations.

The computer program instructions may also be embodied in the form of a computer program product in a computer-readable storage medium, i.e., as computer-readable program code embodied in the medium for use by or in connection with an instruction execution system. The computer-readable storage medium may include, but is not limited to, electronic, magnetic, optical or other storage media, such as a magnetic or optical disk or an integrated circuit memory device. For example, the computer program instructions may be embodied in memory included in a component of a wireless communications apparatus and/or storage medium operable to program such memory. Accordingly, blocks of the schematic diagrams of FIGS. 1-13 support electronic circuits and other apparatus that perform the specified operations, acts for performing the specified operations, and computer program products configured to perform the specified operations.

According to embodiments of the present invention illustrated in FIG. 1, a wireless network 110 includes a reverse link traffic channel code control circuit 112 that is operative to receive an ESN from a wireless terminal 120 and to generate a duplicate ESN indicator responsive to determination that the ESN received from the terminal 120 corresponds to an ESN of a terminal already registered with the network 110. The wireless terminal 120 includes a radio transceiver circuit 122 that receives the duplicate ESN indicator. A reverse link traffic channel code control circuit 125, here shown as implemented in a processor 124 that is operative to control the radio transceiver circuit 122 and to send and receive information to and from the transceiver circuit 122, receives the duplicate ESN indicator and generates a reverse link traffic channel code for use by the radio transceiver circuit 122 responsive thereto.

It will be appreciated that the operations and apparatus illustrated in FIG. 1 may be implemented in a number of different forms within the scope of the present invention. For example, the reverse link traffic channel code control circuit 112 of the network 110 may be lodged in a mobile switching center (MSC) or other component typically found in a wireless communications network, for example, as computer program code executing on a processor in such a component. The reverse link traffic channel code control circuit 112 may receive the ESN of the terminal 120 in, for example, an access channel message sent by the terminal 120 as part of requesting access to the network 110. Techniques known for communicating a terminal ESN to a wireless network are well known and will not be discussed in further detail.

The terminal 120 may be any of a variety of different devices, including, but not limited to, a cellular telephone, a wireless personal digital assistant (PDA), a laptop computer with wireless networking capability, or a host of other types of wireless communications devices. The duplicate ESN indicator conveyed to the terminal 120 may take any of a variety of different forms within the scope of the present invention. For example, as discussed in detail below, the duplicate ESN indicator may include, but is not limited to, information identifying an alternative ESN that the terminal 120 is to use in generating its reverse link traffic channel code, a time shift value that the terminal 120 is to apply to its reverse link traffic channel code, or an alternative long code mask that the terminal 120 is to utilize in generating its reverse link traffic channel code.

It will be appreciated that although embodiments of the present invention can allow terminals bearing the same ESN to concurrently use a system, other measures than ESN monitoring can be used to provide security against identity fraud. For example, authentication of users may involve verification of a Mobile Identification Number (MIN) or other security procedures.

Figure 2:
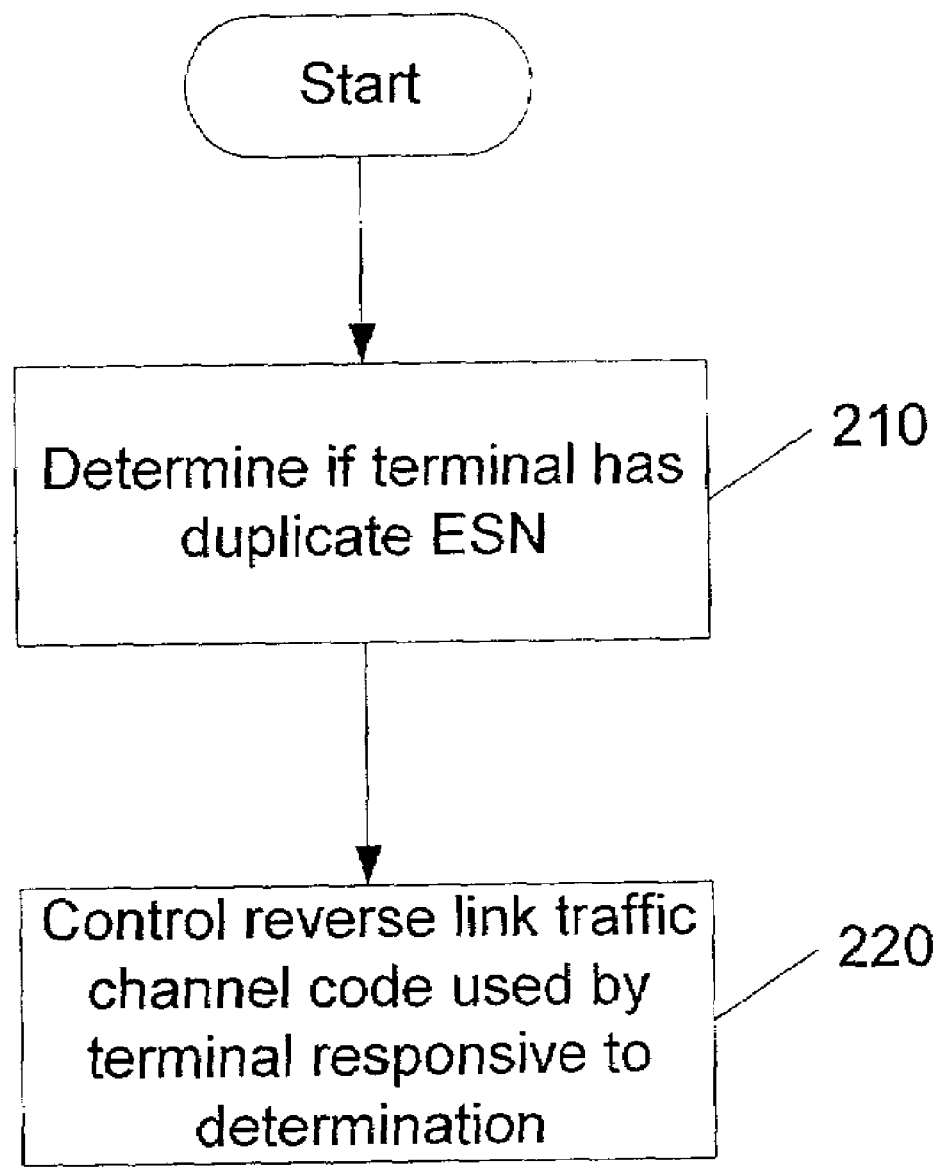
FIGS. 2-5, 7, 9 and 12 are flowcharts illustrating exemplary operations according to various embodiments of the present invention.

FIG. 2 illustrates exemplary operations for accommodating a terminal bearing a duplicate ESN according to some embodiments of the present invention. A determination is made as to whether a terminal possesses a duplicate ESN, i.e., an ESN that matches that of a terminal already using the network (Block 210). A reverse link traffic channel code used by the terminal is controlled responsive to the determining whether the terminal possesses a duplicate ESN (Block 220).

It will be appreciated that the operations illustrated in FIG. 2 may be performed in a wireless network, such as the network 110 of FIG. 1, in a wireless terminal, such as the terminal 120 of FIG. 1, or across network and terminal components. For example, in some embodiments, the act of determining that a duplicate ESN is present may include receipt of an access channel message from the terminal and comparison of the ESN contained in the access channel message to a database of ESN's for terminals already using the system. In other embodiments, the act of determining that a duplicate ESN is present may include a terminal receiving an indication of a duplicate ESN from a network, for example, in response to the network receiving a network access channel message from the terminal. In some embodiments, the act of controlling a reverse link traffic channel code used by the terminal responsive to determination of the presence of a duplicate ESN may include a wireless network instructing the terminal to generate its reverse link traffic channel code in a particular manner. In other embodiments, the act of controlling a reverse link traffic channel code may include a terminal controlling its generation of its reverse link traffic channel code responsive to a duplicate ESN indicator.

Figure 3:
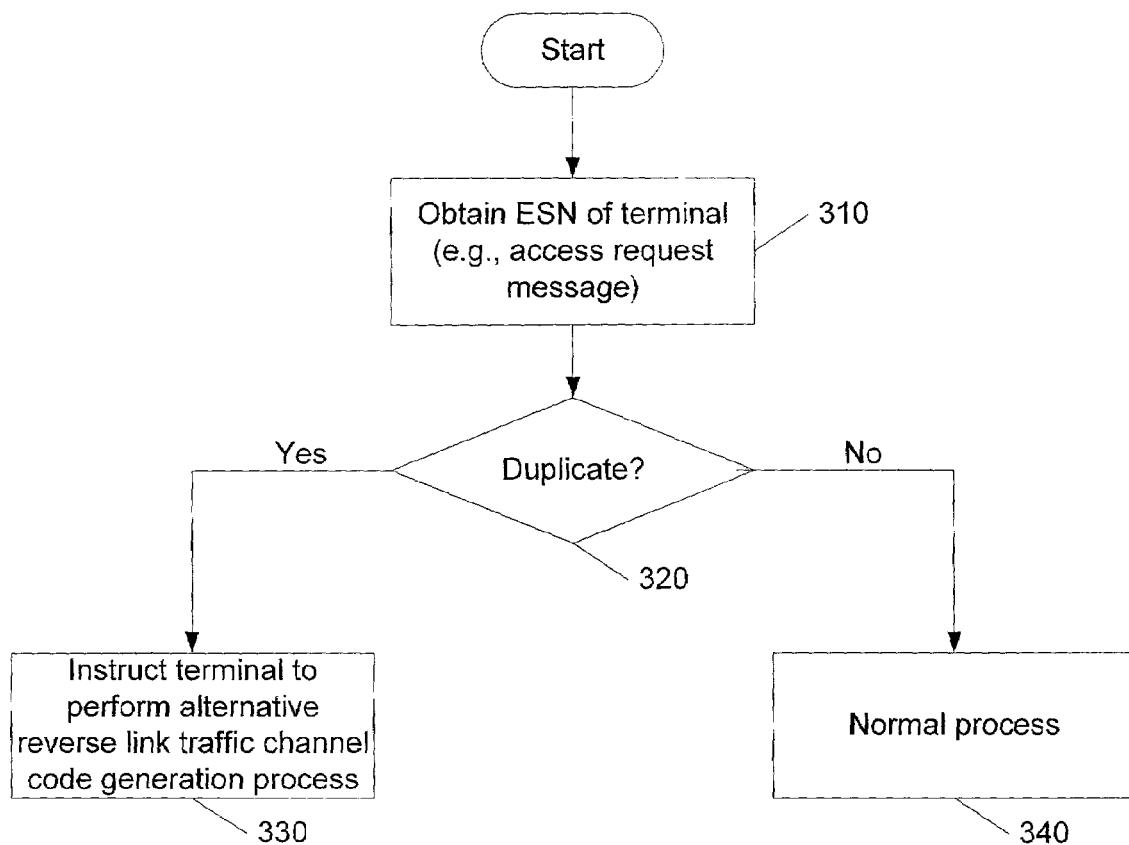

According to some embodiments of the present invention illustrated in FIG. 3, an ESN of a terminal may be obtained, for example, by receiving an access channel message including the ESN from the terminal at a wireless network (Block 310). Upon determination that the ESN is a duplicate (Block 320), the wireless network instructs the terminal to use an alternative reverse link traffic channel code generation process (Block 330). If the network determines that the received ESN is not a duplicate, it allows reverse traffic channel code generation to proceed in a normal fashion, e.g., as specified by conventional protocols (Block 340).

Figure 4:
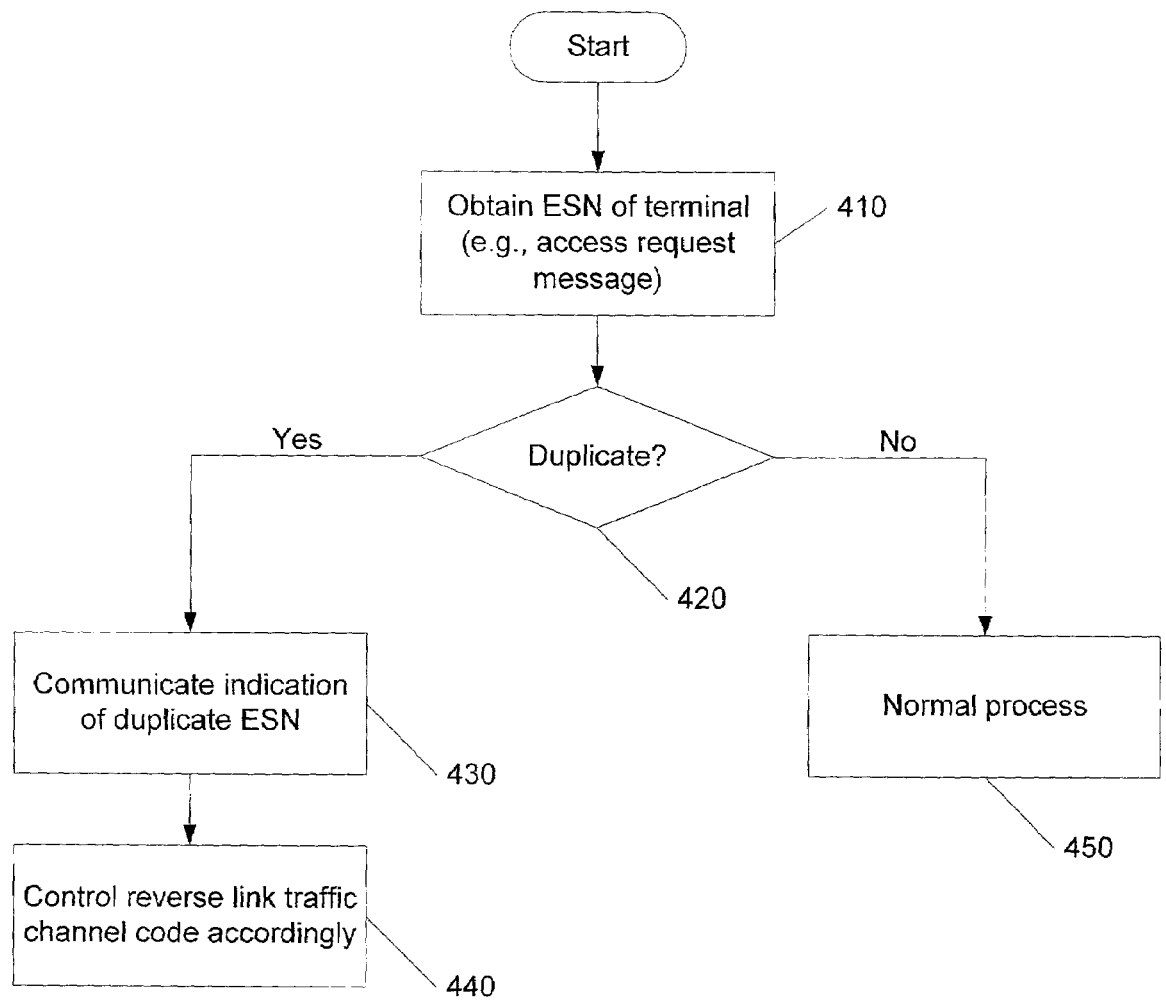

FIG. 4 illustrates exemplary operations for controlling a reverse link traffic channel code according to further embodiments of the present invention. An ESN of a terminal is obtained by a wireless network (Block 410). Upon determination that the ESN is a duplicate (Block 420), the wireless network communicates an indication to the terminal that a duplicate ESN is present (Block 430). The terminal responsively controls its reverse link traffic channel code (Block 440). If the network determines that the received ESN is not a duplicate, the terminal operates in a default or normal fashion (Block 440), e.g., it generates its reverse link traffic channel code in a predetermined way as defined, for example, by conventional protocols. It will be appreciated the indication provided to the terminal (Block 430) may take a number of different forms, including, but not limited to, an alternative ESN, a time shift to be applied to a reverse link traffic channel code, an alternative long code mask, or the like.

Figure 5:
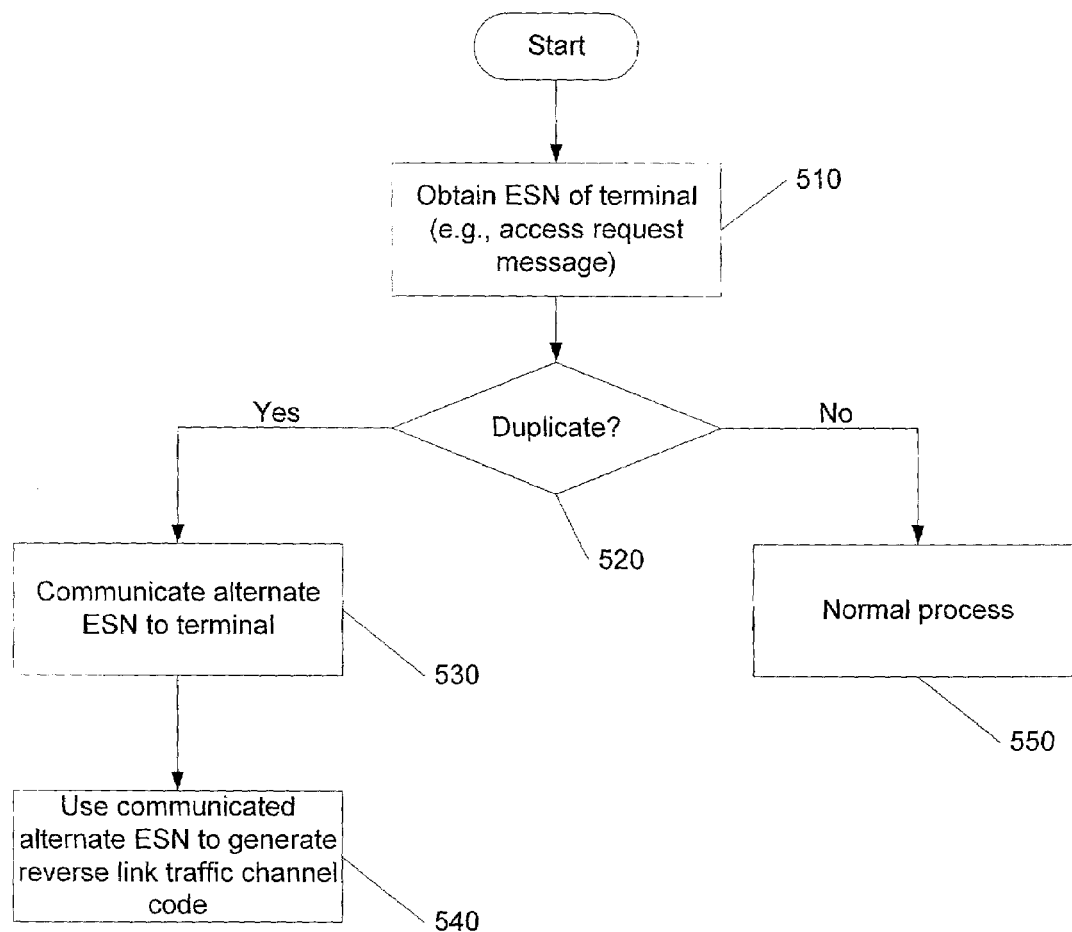

FIG. 5 illustrates exemplary operations for instructing use of an alternative code generation process according to some embodiments of the present invention. An ESN of a terminal is obtained, for example, by receiving an access channel message including the ESN from the terminal at a wireless network (Block 510). Upon determination that the ESN is a duplicate (Block 520), the wireless network communicates a message to the terminal that includes an alternative ESN to be used by the terminal (Block 530). The terminal then uses the alternative ESN in generating its reverse link traffic channel code (Block 540). If the network determines that the received ESN is not a duplicate (Block 520), it allows the terminal to operate normally, e.g., to use its own ESN to generate its reverse link traffic channel code (Block 550). Ways in which an ESN may be used to generate a reverse link traffic channel code are known to those skilled in the art, for example, as shown in *Physical Layer Standard for cdma2000 spread spectrum systems*, 3 GPP2 C.S0002-0 Version 1.0, July 1999 (also published as TIA/EIA/IS-2002), pp. 2-97 through 2-104.

Figure 6:
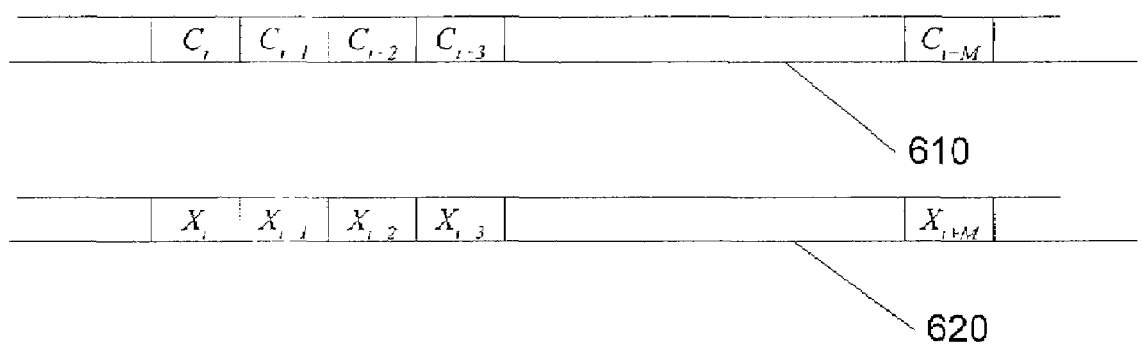
FIGS. 6, 8 and 10 are timing diagrams illustrating exemplary operations according to some embodiments of the present invention.

FIG. 6 illustrates exemplary time relationships between reverse link traffic channel transmission for first and second mobile terminals that possess the same ESN according to the operations described in FIG. 5. In particular, the provision of an alternative ESN to one of the terminals results in different reverse link traffic channel code sequences $C_1, \ldots, C_{1+M}$ and $X_i, \ldots, X_{i+M}$ being applied to the respective reverse link traffic channels 610, 620 of the first and second terminals.

Figure 7:
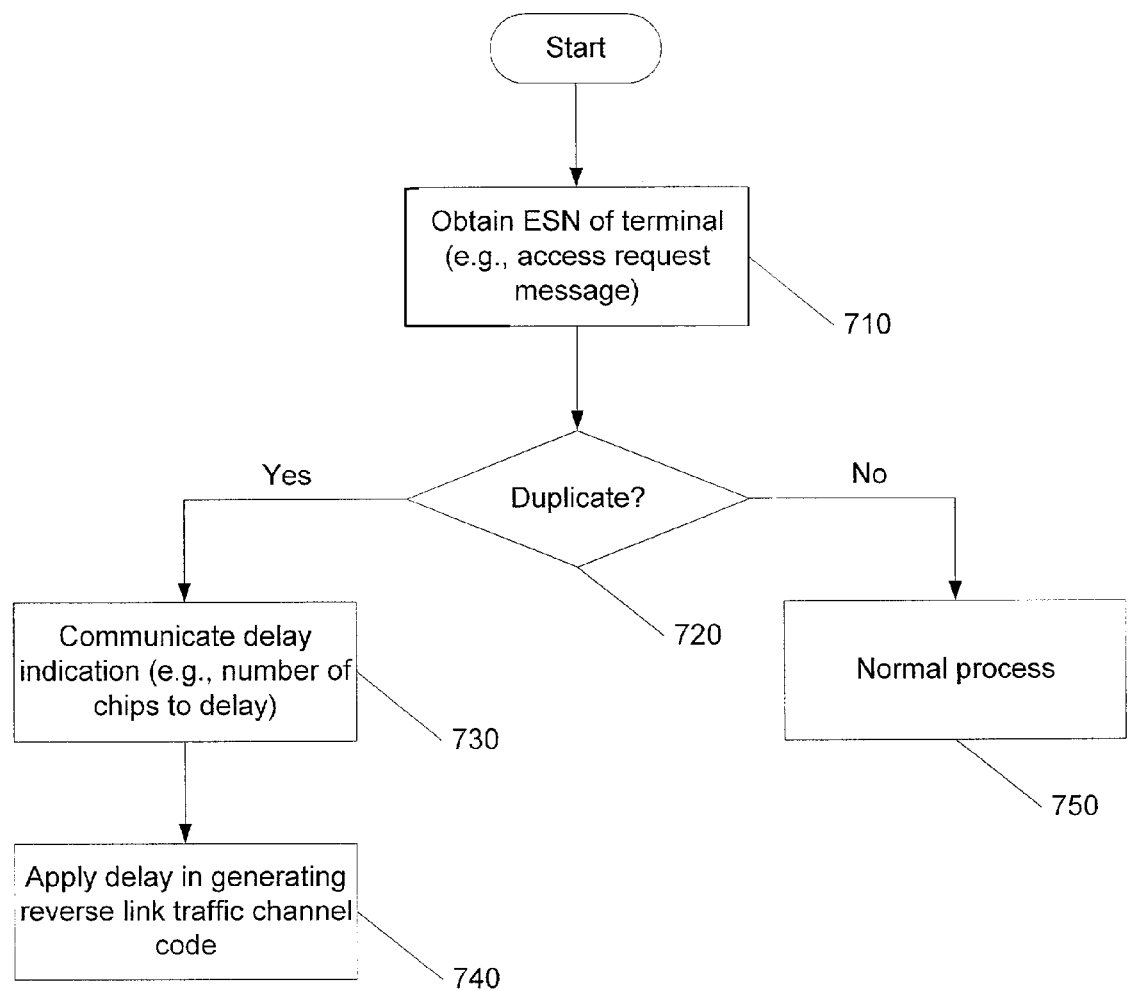

FIG. 7 illustrates exemplary operations for instructing use of an alternative code generation process according to further embodiments of the present invention. An ESN of a terminal is obtained, for example, by receiving an access channel message including the ESN from the terminal at a wireless network (Block 710). Upon determination that the ESN is a duplicate (Block 720), the wireless network transmits a message to the terminal that indicates a time shift (e.g., a delay of a particular number of chips) that the terminal is to apply to its reverse link traffic channel code (Block 730). The terminal responsively applies the time shift to its reverse link traffic channel code (Block 740). If the network determines that the received ESN is not a duplicate (Block 720), it allows the terminal to operate in a default or normal fashion (Block 750).

Figure 8:
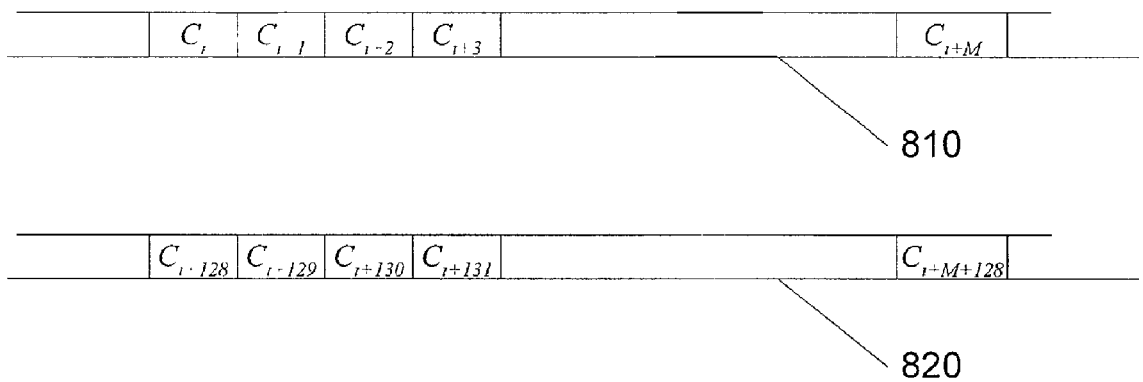

FIG. 8 illustrates exemplary time relationships between reverse link traffic channel transmission for first and second mobile terminals that possess the same ESN according to the operations described in FIG. 7. In particular, the provision of a time shift to one of the terminals results in the reverse link traffic channel code sequence $C_{1+128}, \ldots, C_{1+M+128}$ for one of the reverse link traffic channels 820 that is a 128-chip-shifted version of the reverse link traffic channel code $C_i, \ldots, C_{i+M}$, applied to the other of the reverse link traffic channels 810.

Figure 9:
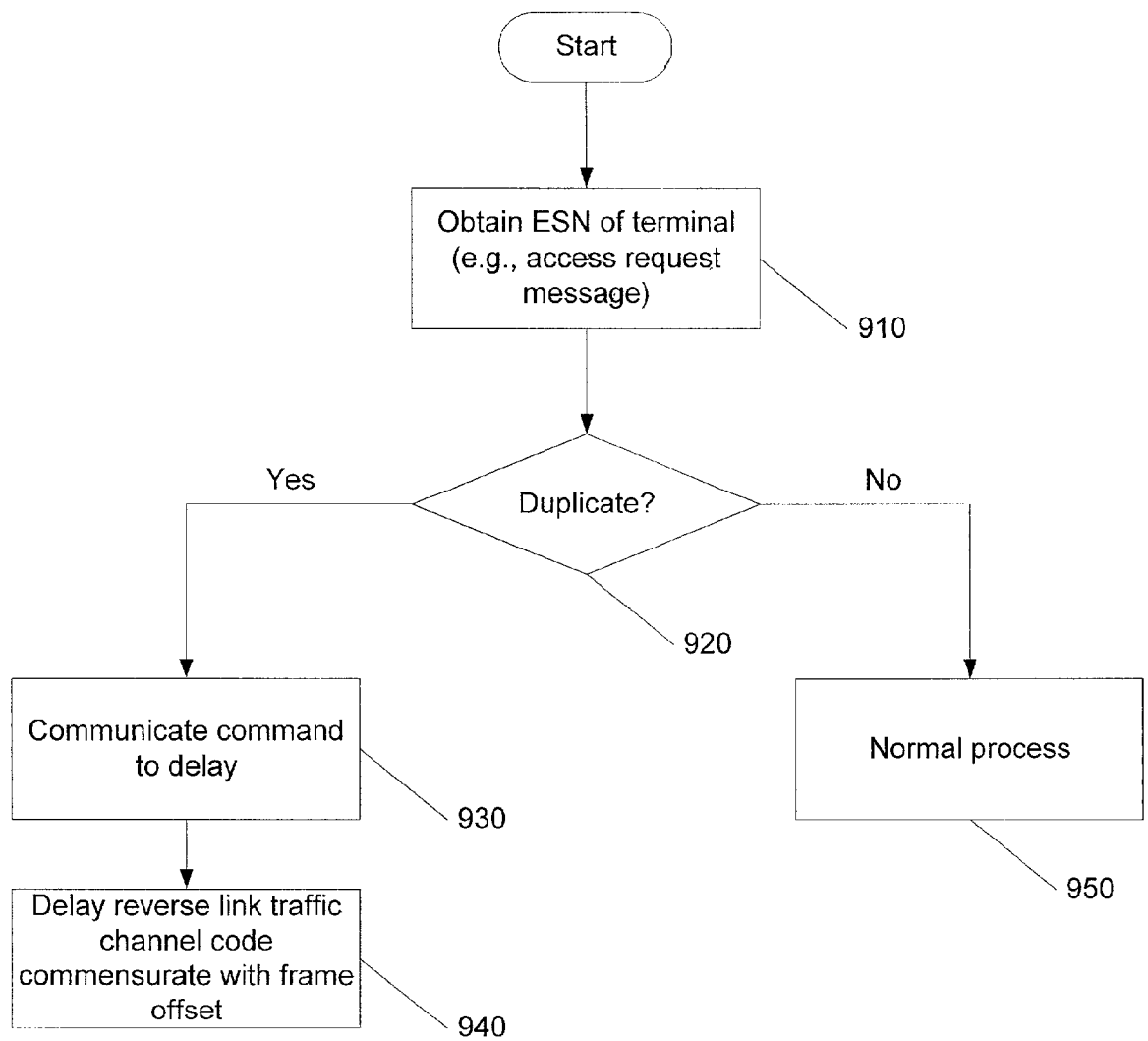
Figure 10:
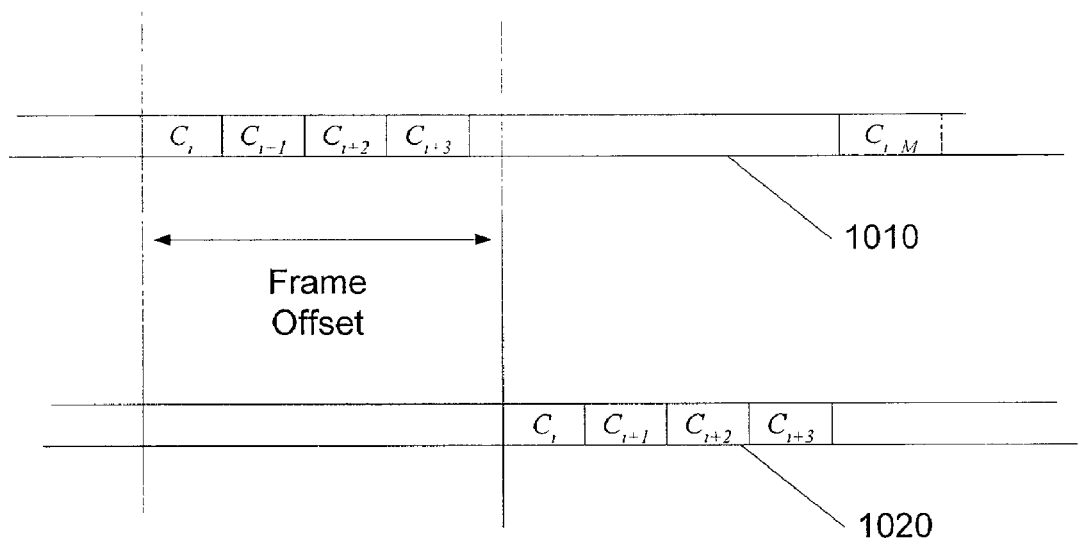

As illustrated in FIG. 9, the time shift applied for a terminal with a duplicate ESN can be commensurate with a frame offset. An ESN of a terminal is obtained, for example, by receiving an access channel message including the ESN from the terminal at a wireless network (Block 910). Upon determination that the ESN is a duplicate (Block 920), the wireless network communicates a command to the terminal to delay its reverse link traffic channel code commensurate with a frame offset assigned to the terminal (Block 930), and the terminal responsively does so (Block 940). If the network determines that the received ESN is not a duplicate (Block 920), however, it allows the terminal to operate in a default or normal fashion (Block 950). FIG. 10 illustrates exemplary timing relationships between reverse link traffic channels 1010, 1020 for duplicate-ESN terminals according to such an approach.

Figure 11:
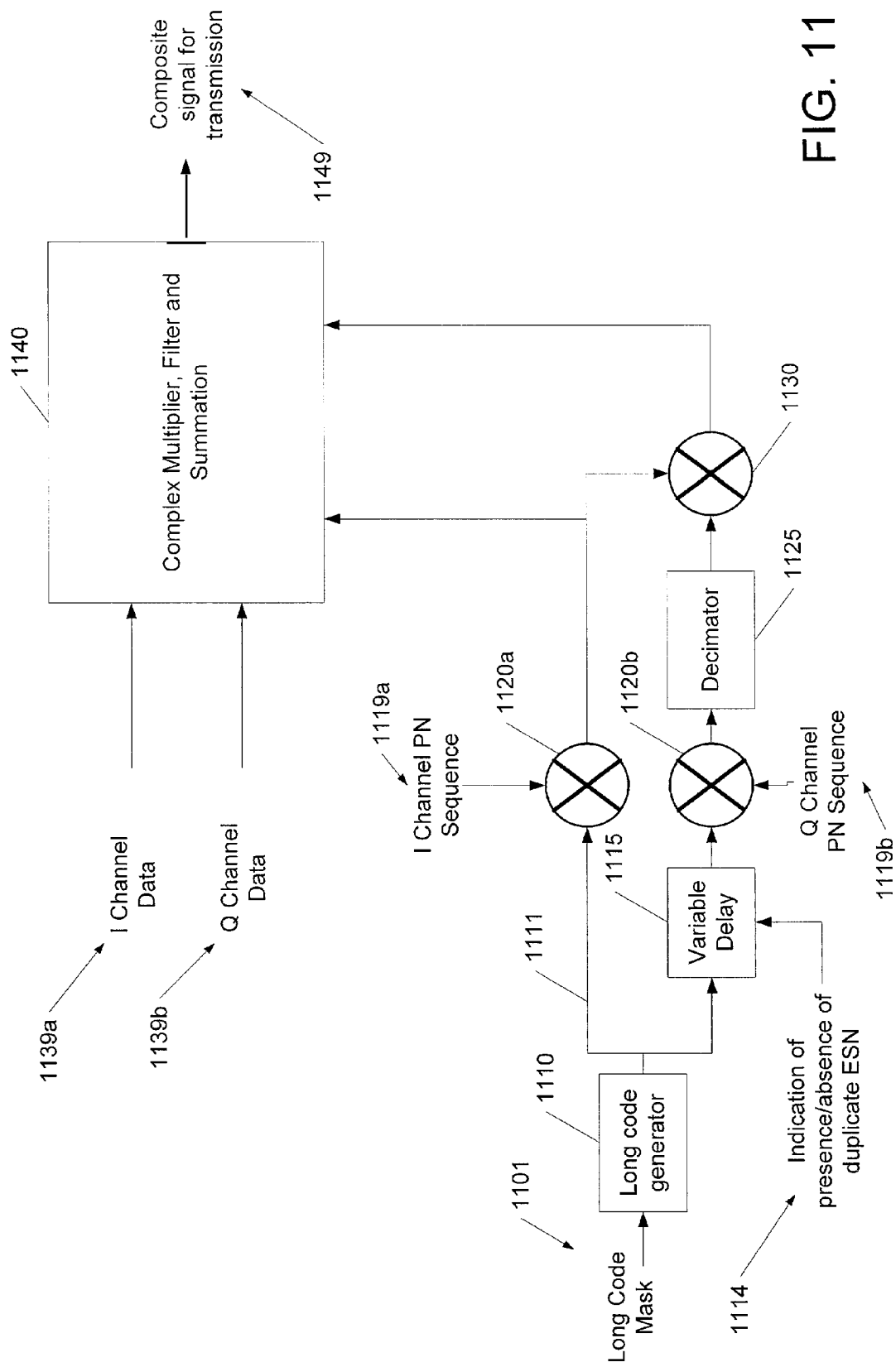
FIG. 11 is a schematic diagram illustrating apparatus for generating a variably delayed long code according to further embodiments of the present invention.

FIG. 11 illustrates alternative apparatus and operation for applying a selective time shift to a reverse link traffic channel code generated by a terminal according to still further embodiments of the present invention. In particular, those skilled in the art will appreciate that FIG. 11 includes components of a wireless terminal transmission path as might be used in an IS-95 or IS-2000 compatible terminal, modified to provide reverse link traffic channel code control according to some embodiments of the present invention. A long code generator 1110 generates a long code 1111 based on a long code mask 1101. The long code 1111 is multiplied by an I-channel PN code 1119*a* in a first multiplier 1120*a*. The long code 1111 is also passed to a variable delay circuit 1115, which provides a delayed version of the long code to a second multiplier 1120*b*, where it is multiplied by a Q-channel PN code 1119*b*. After the Q-channel component is decimated in a decimator 1125, I and Q-channel components are Walsh coded in a Walsh coder 1130, and applied to a complex multiplier, filter and summation circuit 1140 which uses the codes to spread I and Q channel data 1139*a*, 1139*b* to form a composite signal 1149 for transmission from the terminal. As shown, the amount of delay provided by the variable delay circuit 1115 may be responsive to an indication 1114 of the presence or absence of a duplicate ESN condition. Analysis indicates that, although this approach may result in less than optimal reduction of peak to average ratio (PAR) for the terminal's power amplifier under some conditions, the amount of degradation may be acceptable.

Figure 12:
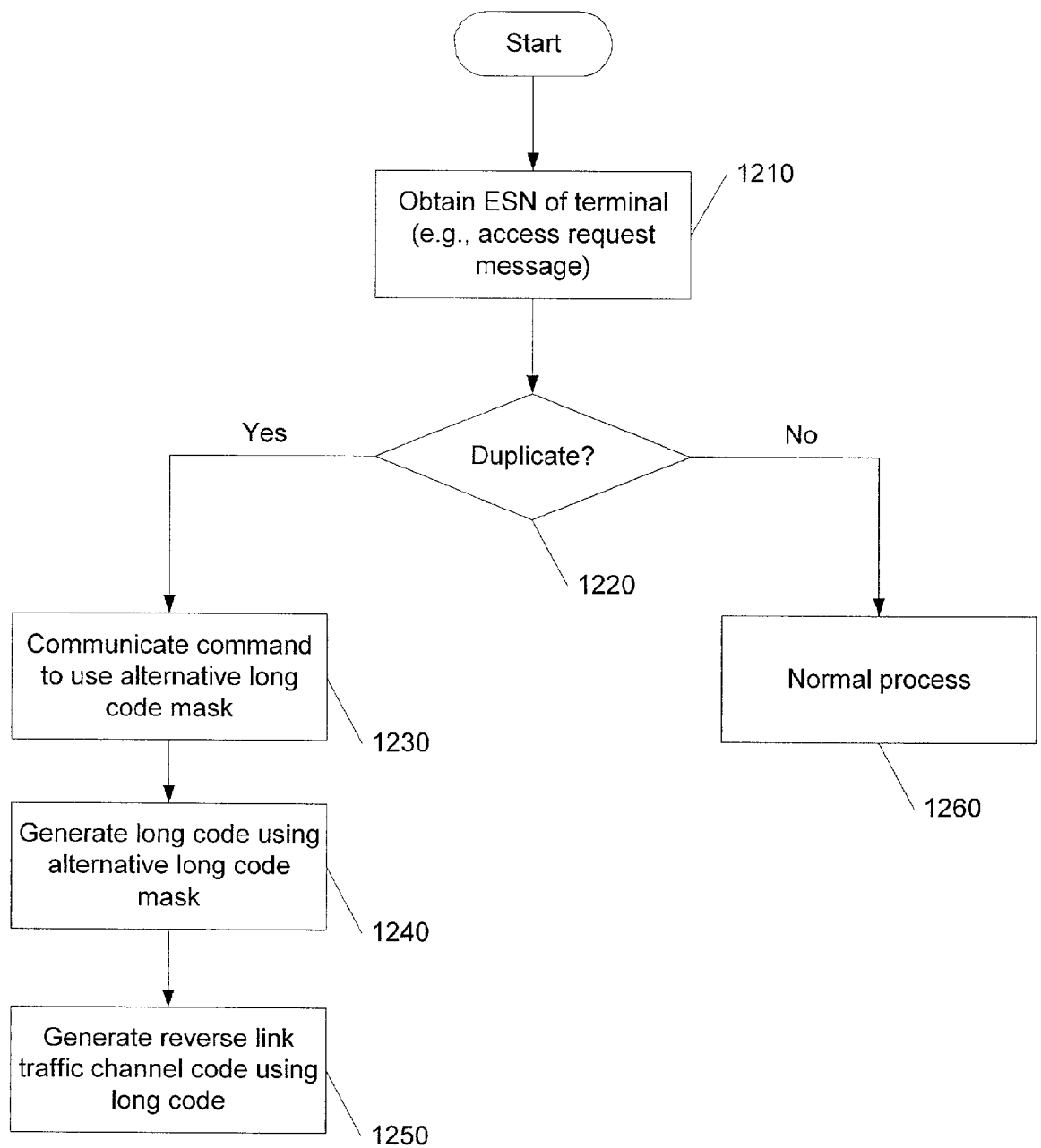

FIG. 12 illustrates exemplary operations for instructing use of an alternate long code mask in a reverse link traffic channel code generation process according to still further embodiments of the present invention. An ESN of a terminal is obtained, for example, by receiving an access channel message including the ESN from the terminal at a wireless network (Block 1210). Upon determination that the ESN is a duplicate (Block 1220), the wireless network communicates a command to the terminal that it use an alternative long code mask in generating its reverse link traffic channel code (Block 1230). The terminal responsively generates a long code using the mask (Block 1240) and uses the long code to generate its reverse link traffic channel code (Block 1250). If the network determines that the received ESN is not a duplicate (Block 1220), it allows the terminal to operate in a default or normal fashion (Block 1260).

Figure 13:
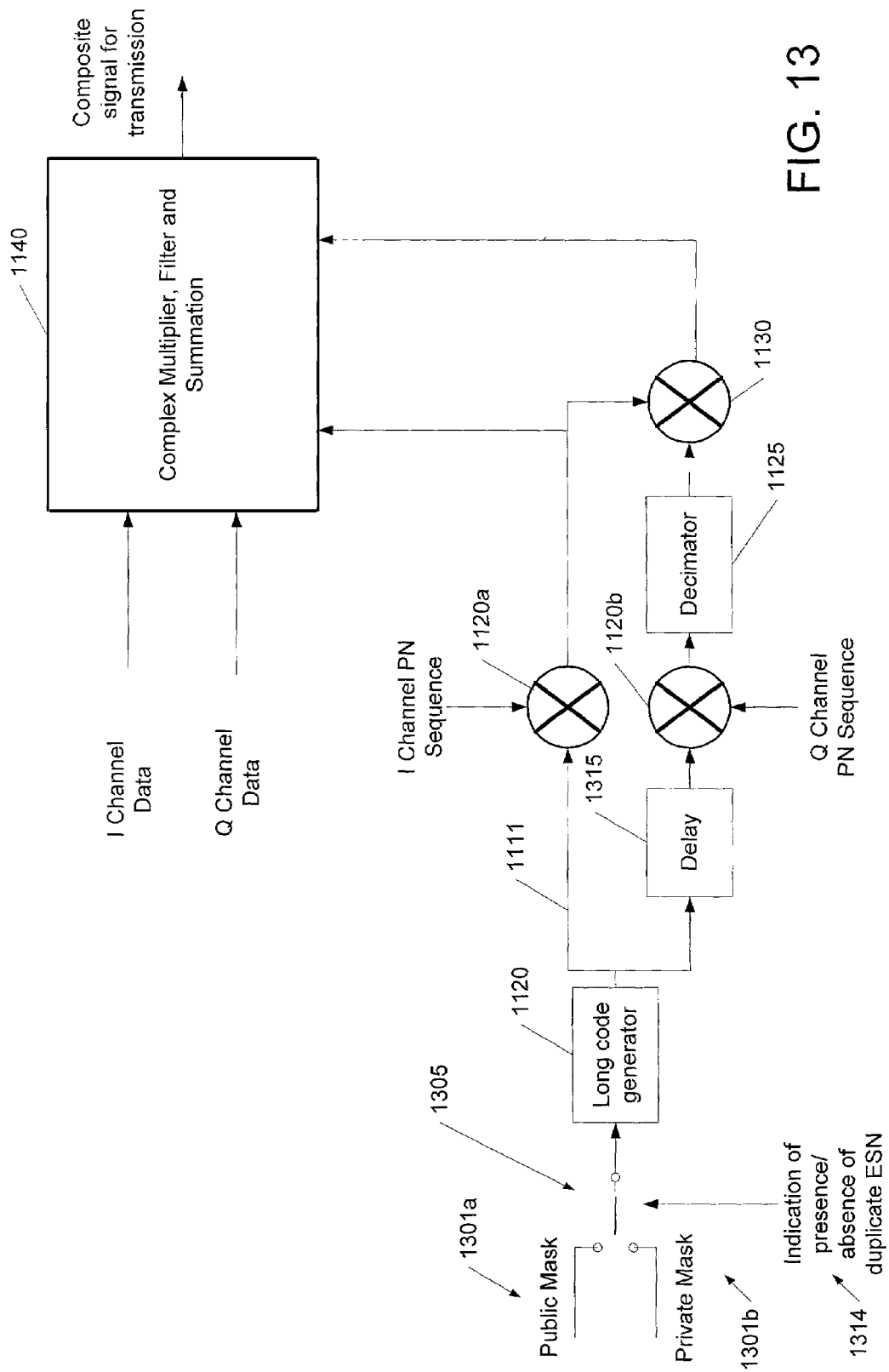
FIG. 13 is a schematic diagram illustrating apparatus for generating a variably masked long code according to further embodiments of the present invention.

It will be appreciated that the operations of FIG. 12 may be implemented, for example, using a "voice privacy" feature that is found in many CDMA systems. According to such embodiments, if a system that has a first terminal assigned a non-private long code mask receives an access request from a second terminal bearing a duplicate ESN, the second terminal may be instructed to use a long code mask that is associated with the voice privacy feature. It will be further understood that the assignment could be the converse, i.e., the duplicate ESN terminal may be assigned to the non-private long code mask FIG. 13 illustrates exemplary apparatus and operations for such an alternate masking scheme. In particular, FIG. 13 illustrates a transmission path similar to that illustrated in FIG. 11, with like items indicated by like reference numerals. Here, instead of providing a variable delay of the long code 1111, a fixed delay 1315 is provided, and a selector 1305 selects one of a public long code mask 1301a or a private long code mask 1301b for provision to the long code generator 1120. The selector 1305 operates responsive to an indication 1314 of the presence/absence of a duplicate ESN. It will be appreciated that such functionality can be provided in current systems that offer a so-called "voice privacy" feature, by making provision of voice privacy dependent upon detection of duplicate ESN. For example, detection of a duplicate ESN can lead to application or denial of voice privacy depending on the voice privacy status of another terminal bearing the same ESN.

In the drawings and specification, there have been disclosed exemplary embodiments of the invention. Although specific terms are employed, they are used in a generic and descriptive sense only and not for purposes of limitation.

That which is claimed is:

1. A method of operating in a CDMA wireless communication system, the method comprising:
determining whether a terminal accessing the wireless communications system has a duplicate Electronic Serial Number (ESN); and
controlling a reverse link traffic channel code used by the terminal responsive to the determining whether the terminal has a duplicate ESN.

2. A method according to claim 1, wherein controlling a reverse link traffic channel code used by the terminal comprises selecting a reverse link traffic channel code generation process for the terminal responsive to the determining whether the terminal has a duplicate ESN.

3. A method according to claim 2, wherein selecting a reverse link traffic channel code generation process for the terminal comprises assigning an alternative ESN to the terminal responsive to detection of a duplicate ESN.

4. A method according to claim 3, further comprising communicating the alternative ESN to the terminal.

5. A method according to claim 4, further comprising using the alternative ESN to generate a reverse link traffic channel code for a reverse link between the terminal and a wireless base station.

6. A method according to claim 1, wherein controlling a reverse link traffic channel code used by the terminal comprises instructing the terminal to apply a time shift to the reverse link traffic channel code responsive to detection of a duplicate ESN.

7. A method according to claim 6, wherein instructing the terminal to apply a time shift comprises communicating the time shift to the terminal.

8. A method according to claim 7, further comprising applying the communicated time shift in generating a reverse link traffic channel code for a reverse link between the terminal and a wireless base station.

9. A method according to claim 6, wherein instructing the terminal to apply a time shift comprises instructing the terminal to delay the reverse link traffic channel code commensurate with a frame offset assigned to the terminal responsive to detection of a duplicate ESN.

10. A method according to claim 6, wherein instructing the terminal to apply a time shift comprises instructing the terminal to provide a predetermined delay of a long code before multiplication of the long code by a PN code responsive to detection of a duplicate ESN.

11. A method according to claim 10, wherein instructing the terminal to provide a predetermined delay of a long code comprises instructing the terminal to provide the predetermined delay before multiplication by a Q-channel PN code.

12. A method according to claim 1, wherein controlling a reverse link traffic channel code used by the terminal comprises instructing the terminal to use an alternative long code mask to generate the reverse link traffic channel code responsive to detection of a duplicate ESN.

13. A method according to claim 12 wherein instructing the terminal to use an alternative long code mask comprises instructing the terminal to select one of a public long code mask or a private long code mask responsive to detection of a duplicate ESN.

14. A method of operating a CDMA wireless terminal, the method comprising:
receiving an indication from a wireless communications system that the terminal has a duplicate Electronic Serial Number (ESN); and
controlling a reverse link traffic channel code used by the terminal responsive to the received indication that the terminal has a duplicate ESN.

15. A method according to claim 14, wherein controlling a reverse link traffic channel code used by the terminal comprises selecting a reverse link traffic channel code generation process responsive to the indication that the terminal has a duplicate ESN.

16. A method according to claim 15:
wherein receiving an indication from a wireless communications system that the terminal has a duplicate Electronic Serial Number (ESN) comprises receiving an alternate ESN; and
wherein selecting a reverse link traffic channel code generation process comprises using the alternative ESN to generate the reverse link traffic channel code.

17. A method according to claim 14:
wherein receiving an indication from a wireless communications system that the terminal has a duplicate ESN comprises receiving an indication of a time shift from the wireless communication system; and
wherein controlling a reverse link traffic channel code used by the terminal comprises applying the time shift to the reverse link traffic channel code.

18. A method according to claim 17, wherein applying the time shift comprises delaying the reverse link traffic channel code commensurate with a frame offset assigned to the terminal.

19. A method according to claim 17, wherein applying the time shift comprises instructing the terminal to provide a predetermined delay of a long code before multiplication of the long code by a PN code.

20. A method according to claim 19, wherein instructing the terminal to provide a predetermined delay of the long code comprises instructing the terminal to provide the predetermined delay before multiplication by a Q-channel PN code.

21. A method according to claim 14, wherein controlling a reverse link traffic channel code used by the terminal comprises using an alternative long code mask to generate the reverse link traffic channel code responsive to the received indication that the terminal has a duplicate ESN.

22. A method according to claim 21, wherein using an alternative long code mask comprises selecting one of a public long code mask or a private long code mask.

23. A CDMA wireless communication apparatus, comprising:
means for determining whether a terminal accessing the wireless communications system has a duplicate Electronic Serial Number (ESN); and
means for controlling a reverse link traffic channel code used by the terminal responsive to the determining whether the terminal has a duplicate ESN.

24. An apparatus according to claim 23, wherein the means for controlling a reverse link traffic channel code used by the terminal comprises means for selecting a reverse link traffic channel code generation process for the terminal responsive to the determining whether the terminal has a duplicate ESN.

25. An apparatus according to claim 24, wherein the means for selecting a reverse link traffic channel code generation process for the terminal comprises assigning an alternative ESN to the terminal responsive to detection of a duplicate ESN.

26. An apparatus according to claim 23, wherein the means for controlling a reverse link traffic channel code used by the terminal comprises means for instructing the terminal to apply a time shift to the reverse link traffic channel code responsive to detection of a duplicate ESN.

27. An apparatus according to claim 26, wherein the means for instructing the terminal to apply a time shift comprises means for instructing the terminal to delay the reverse link traffic channel code commensurate with a frame offset assigned to the terminal responsive to detection of a duplicate ESN.

28. An apparatus according to claim 26 wherein the means for instructing the terminal to apply a time shift comprises means for instructing the terminal to provide a predetermined delay of a long code before multiplication of the long code by a PN code responsive to detection of a duplicate ESN.

29. An apparatus according to claim 23, wherein the means for controlling a reverse link traffic channel code used by the terminal comprises means for instructing the terminal to use an alternative long code mask to generate the reverse link traffic channel code responsive to detection of a duplicate ESN.

30. An apparatus according to claim 29, wherein the means for instructing the terminal to use an alternative long code mask comprises means for instructing the terminal to select one of a public long code mask or a private long code mask responsive to detection of a duplicate ESN.

31. A CDMA wireless terminal, comprising:
means for receiving an indication from a wireless communications system that the terminal has a duplicate Electronic Serial Number (ESN); and
means for controlling a reverse link traffic channel code used by the terminal responsive to the received indication that the terminal has a duplicate ESN.

32. A CDMA wireless terminal according to claim 31:
wherein the means for receiving an indication from a wireless communications system that the terminal has a duplicate Electronic Serial Number (ESN) comprises means for receiving an alternate ESN; and wherein the means for controlling a reverse link traffic channel code comprises means for generating the reverse link traffic channel code from the alternative ESN.

33. A CDMA wireless terminal according to claim 31:
wherein the means for receiving an indication from a wireless communications system that the terminal has a duplicate ESN comprises means for receiving an indication of a time shift; and
wherein the means for controlling a reverse link traffic channel code used by the terminal comprises means for applying the indicated time shift to the reverse link traffic channel code.

34. A CDMA wireless terminal according to claim 33, wherein the means for applying the time shift comprises means for delaying the reverse link traffic channel code commensurate with a frame offset assigned to the terminal.

35. A CDMA wireless terminal according to claim 33, wherein the means for applying the time shift comprises means for delaying a long code before multiplication of the long code by a PN code.

36. A CDMA wireless terminal according to claim 35, wherein the means for delaying a long code comprises means for delaying the long code before multiplication of the delayed long code by a Q-channel PN code.

37. A CDMA wireless terminal according to claim 31, wherein the means for controlling a reverse link traffic channel code used by the terminal comprises means for using an alternative long code mask to generate the reverse link traffic channel code responsive to the received indication that the terminal has a duplicate ESN.

38. A CDMA wireless terminal according to claim 37, wherein the means for using an alternative long code mask comprises means for selecting one of a public long code mask or a private long code mask.

39. A CDMA wireless terminal, comprising:
a radio communications circuit operative to send and receive radio signals; and
a control circuit coupled to the radio communications circuit and operative to control a reverse link traffic channel code used by the radio communications circuit responsive to a received indication that the terminal has a duplicate ESN.

40. A CDMA wireless terminal according to claim 39, wherein the control circuit is operative to select a reverse link traffic channel code generation process responsive to the received indication that the terminal has a duplicate ESN.

41. A CDMA wireless terminal according to claim 40, wherein the control circuit is operative to use an alternative ESN to generate the reverse link traffic channel code responsive to the received indication that the terminal has a duplicate ESN.

42. A CDMA wireless terminal according to claim 39, wherein the control circuit is operative to apply a time shift to the reverse link traffic channel code responsive to the received indication that the terminal has a duplicate ESN.

43. A CDMA wireless terminal according to claim 42, wherein the control circuit is operative to delay the reverse link traffic channel code commensurate with a frame offset assigned to the terminal responsive to the received indication that the terminal has a duplicate ESN.

44. A CDMA wireless terminal according to claim 42, wherein the control circuit is operative to delay a long code before multiplication of the long code by a PN code responsive to the received indication that the terminal has a duplicate ESN.

45. A CDMA wireless terminal according to claim 44, wherein the control circuit is operative to delay the long code before multiplication by a Q-channel PN code.

46. A CDMA wireless terminal according to claim 39, wherein the control circuit is operative to use an alternative long code mask responsive to the received indication that the terminal has a duplicate ESN.

47. A computer program product for operating a CDMA wireless terminal, the computer program product comprising computer-readable program code embodied in a computer-readable program storage medium, the computer-readable program code comprising:
  program code configured to control a reverse link traffic channel code used by the terminal responsive to a received indication that the terminal has a duplicate ESN.

48. A computer program product according to claim 47, wherein the program code configured to control a reverse link traffic channel code used by the terminal comprises program code configured to generate the reverse link traffic channel code using an alternative ESN responsive to the received indication that the terminal has a duplicate ESN.

49. A computer program product according to claim 47, wherein the program code configured to control a reverse link traffic channel code used by the terminal comprises program code configured to apply a time shift to the reverse link traffic channel code responsive to the received indication that the terminal has a duplicate ESN.

50. A computer program product according to claim 49, wherein the program code configured to apply a time shift to the reverse link traffic channel code comprises program code configured to delay the reverse link traffic channel code commensurate with a frame offset assigned to the terminal.

51. A computer program product according to claim 49, wherein the program code configured to apply a time shift to the reverse link traffic channel code comprises program code configured to delay a long code before multiplication of the long code by a PN code.

52. A computer program product according to claim 49, wherein the program code configured to apply a time shift to the reverse link traffic channel code comprises program code configured to generate a long code using an alternative long code mask responsive to the received indication that the terminal has a duplicate ESN.

53. A computer program product for operating a CDMA wireless communications system, the computer program product comprising computer-readable program code embodied in a computer-readable program storage medium, the computer-readable program code comprising:
  program code configured to determine whether a terminal accessing the wireless communications system has a duplicate Electronic Serial Number (ESN); and
  program code configured to control a reverse link traffic channel code used by the terminal responsive to the determining whether the terminal has a duplicate ESN.

54. A computer program product according to claim 53, wherein the program code configured to control a reverse link traffic channel code comprises program code configured to assign an alternative ESN to the terminal responsive to detection of a duplicate ESN.

55. A computer program product according to claim 53, wherein the program code configured to control a reverse link traffic channel code comprises program code configured to instruct the terminal to apply a time shift to the reverse link traffic channel code responsive to detection of a duplicate ESN.

56. A computer program product according to claim 55, wherein the program code configured to instruct the terminal to apply a time shift to the reverse link traffic channel code comprises program code configured to instruct the terminal to delay the reverse link traffic channel code commensurate with a frame offset assigned to the terminal responsive to detection of a duplicate ESN.

57. A computer program product according to claim 55, wherein the program code configured to instruct the terminal to apply a time shift to the reverse link traffic channel code comprises program code configured to instruct the terminal to provide a predetermined delay of a long code before multiplication of the long code by a PN code responsive to detection of a duplicate ESN.

58. A computer program product according to claim 53, wherein the program code configured to control a reverse link traffic channel code comprises program code configured to instruct the terminal to use an alternative long code mask to generate the reverse link traffic channel code responsive to detection of a duplicate ESN.

* * * * *